United States Patent [19]
Voorhees

[11] Patent Number: 6,068,120
[45] Date of Patent: May 30, 2000

[54] SMALL VEHICLE SECURITY DEVICE

[75] Inventor: Stephen C. Voorhees, Bellevue, Wash.

[73] Assignee: BikeLid Systems LLC, New York, N.Y.

[21] Appl. No.: 09/051,472

[22] PCT Filed: Oct. 16, 1996

[86] PCT No.: PCT/US96/14388

§ 371 Date: Sep. 8, 1998

§ 102(e) Date: Sep. 8, 1998

[87] PCT Pub. No.: WO97/14633

PCT Pub. Date: Apr. 24, 1997

Related U.S. Application Data

[63] Continuation-in-part of application No. 08/543,633, Oct. 16, 1995, abandoned.

[51] Int. Cl.[7] .................................................... B65D 85/68
[52] U.S. Cl. ............................................................ 206/335
[58] Field of Search ................................... 206/304, 335, 206/504; 224/326, 338, 532, 525, 488; 150/167, 166; 217/37

[56] References Cited

U.S. PATENT DOCUMENTS

| | | | |
|---|---|---|---|
| 2,311,514 | 2/1943 | Bramblett | 150/166 |
| 3,861,092 | 1/1975 | Dale et al. | |
| 3,886,988 | 6/1975 | Garrett et al. | 150/167 |
| 3,907,184 | 9/1975 | Zane et al. | 224/326 |
| 3,945,159 | 3/1976 | Girnus, Sr. | |
| 3,949,528 | 4/1976 | Hartger et al. | 52/79 |
| 4,084,735 | 4/1978 | Kappas | 224/136 |
| 4,598,693 | 7/1986 | Koziol | |
| 4,693,289 | 9/1987 | Taylor et al. | 150/166 |
| 4,804,238 | 2/1989 | Bischof et al. | |
| 4,907,728 | 3/1990 | Giblet | |
| 5,533,616 | 7/1996 | Crowfoot | 206/335 |

FOREIGN PATENT DOCUMENTS

| | | |
|---|---|---|
| 2449765 | 9/1980 | France |
| 2499617 | 8/1982 | France |
| 830697 | 2/1952 | Germany |
| 846458 | 8/1952 | Germany |
| 9214083 | 1/1993 | Germany |

*Primary Examiner*—David T. Fidei
*Attorney, Agent, or Firm*—St. Onge Steward Johnston & Reens LLC

[57] ABSTRACT

A durable, versatile and economical device for securing and protecting bicycles, motorcycles, personal watercraft, snowmobiles, all-terrain vehicles and the like (10). The device comprises a shell or lid (20) attached to a base (60). Alternatively, the shell can be secured to the floor, ground or wall without a base structure. The shell can be lifted around a pivot point (22) to access the vehicle and lowered to secure it. When closed in the down position, the shell can be locked to the frame, completely securing and encapsulating the vehicle. The preferred plastic shell is an economical and durable cover, particularly when crime and vandalism is an issue.

15 Claims, 17 Drawing Sheets

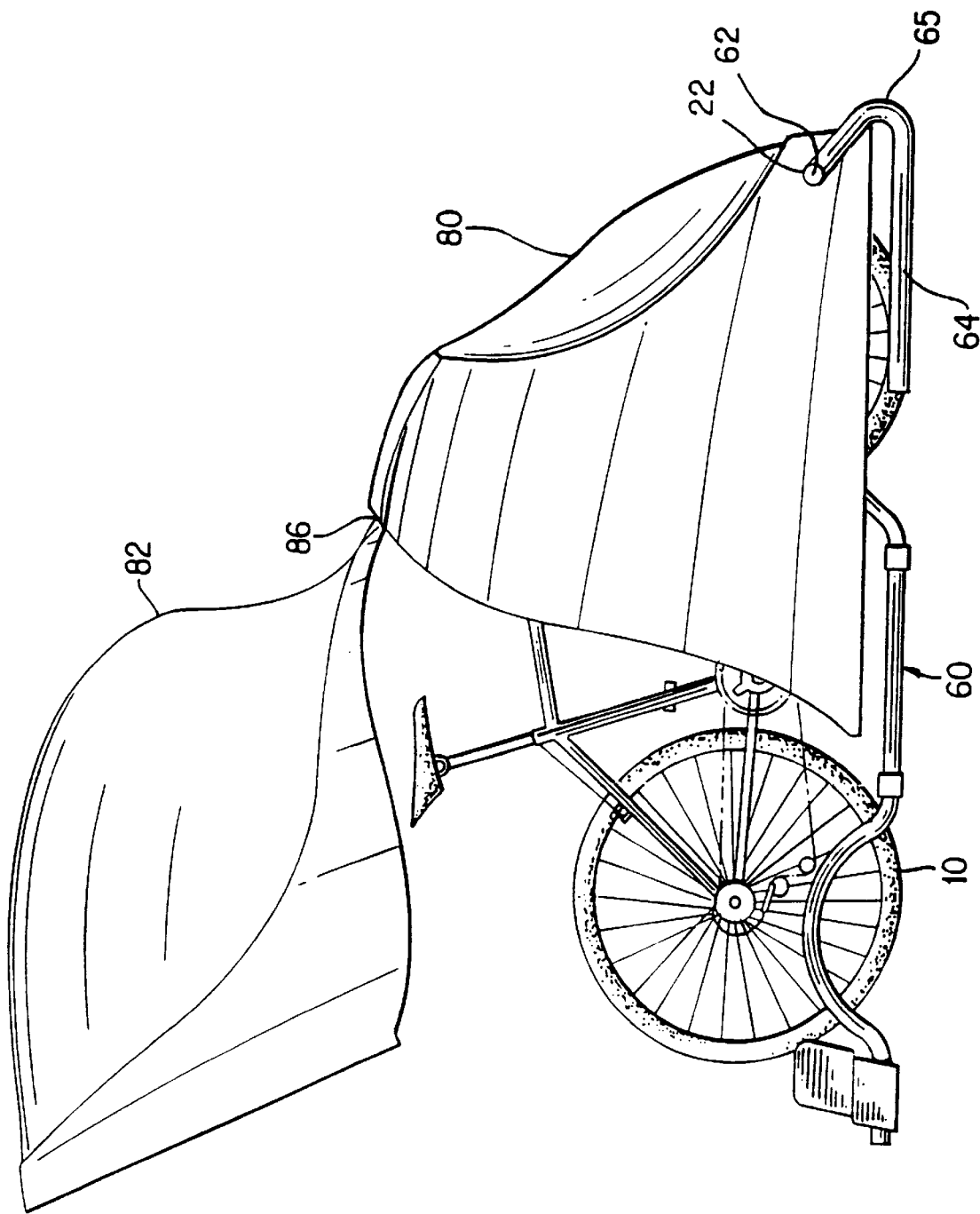

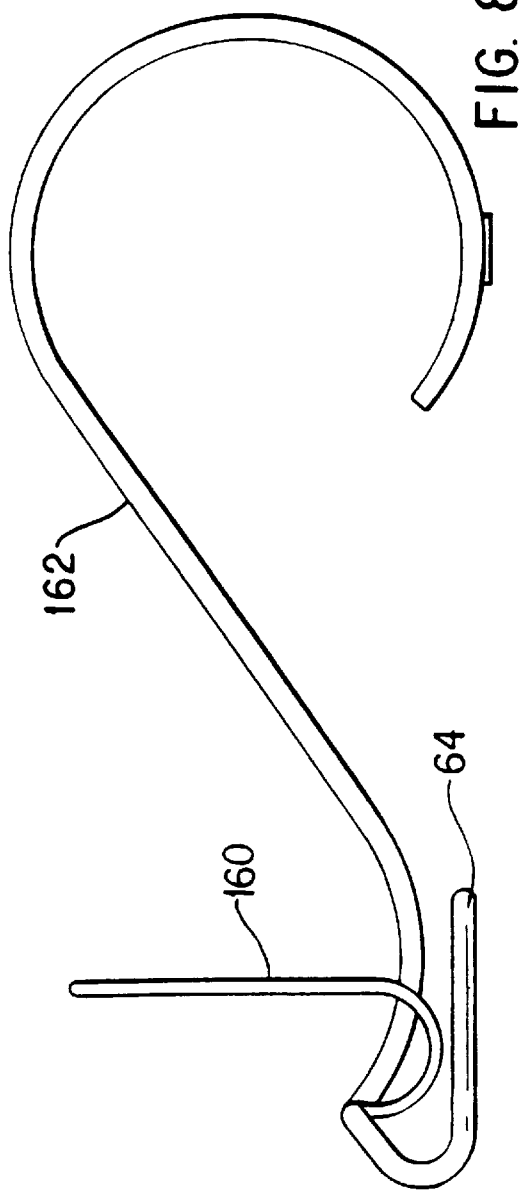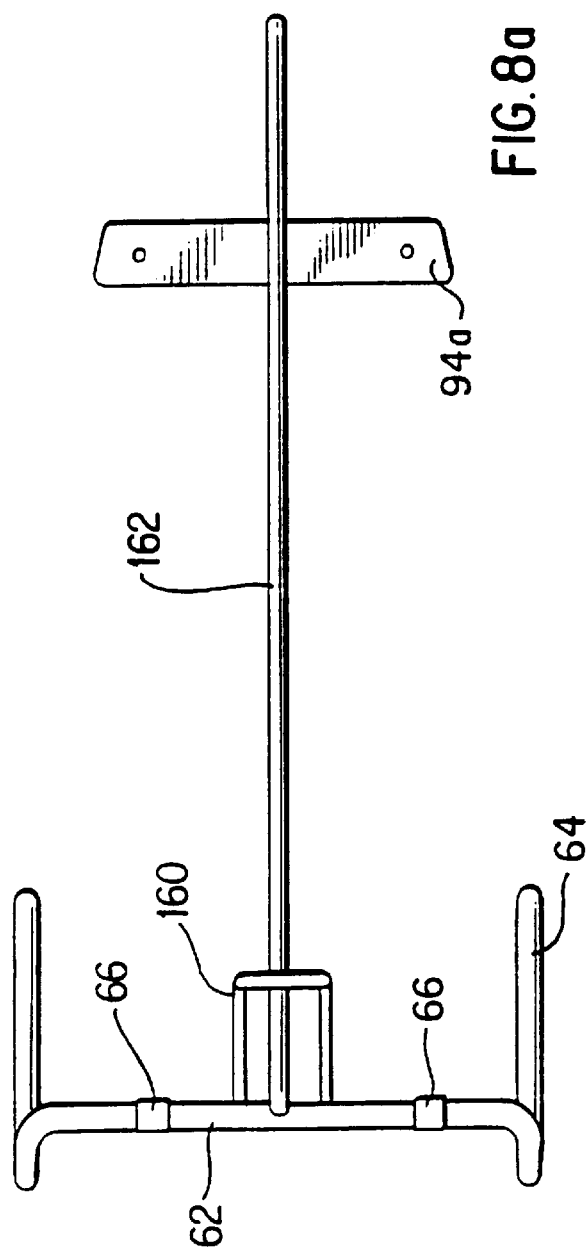

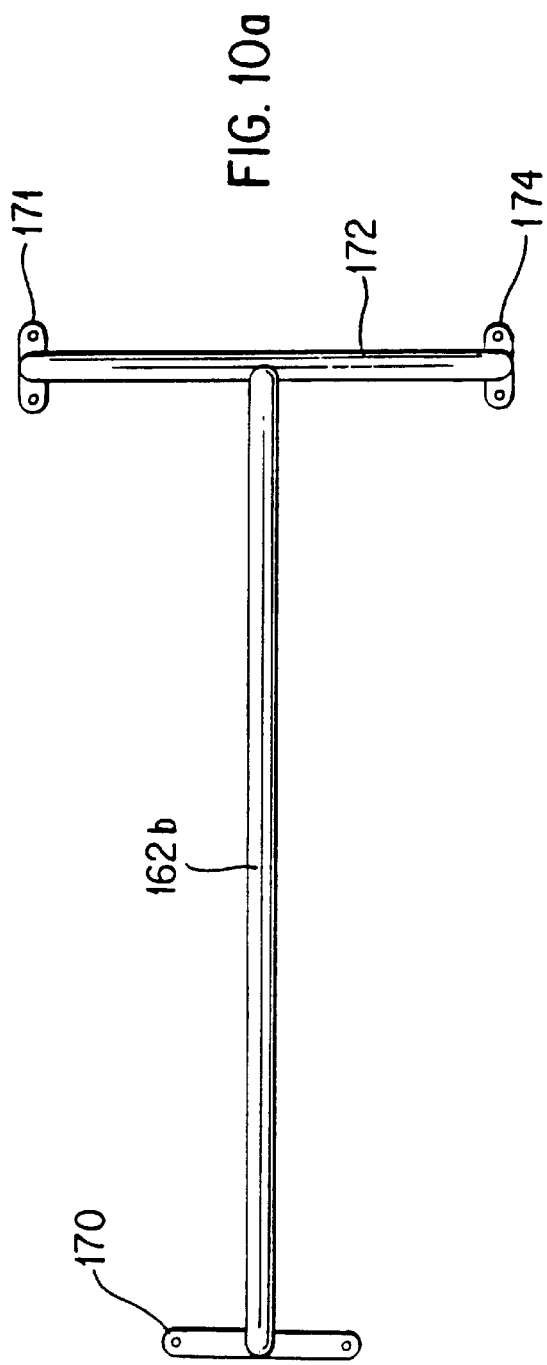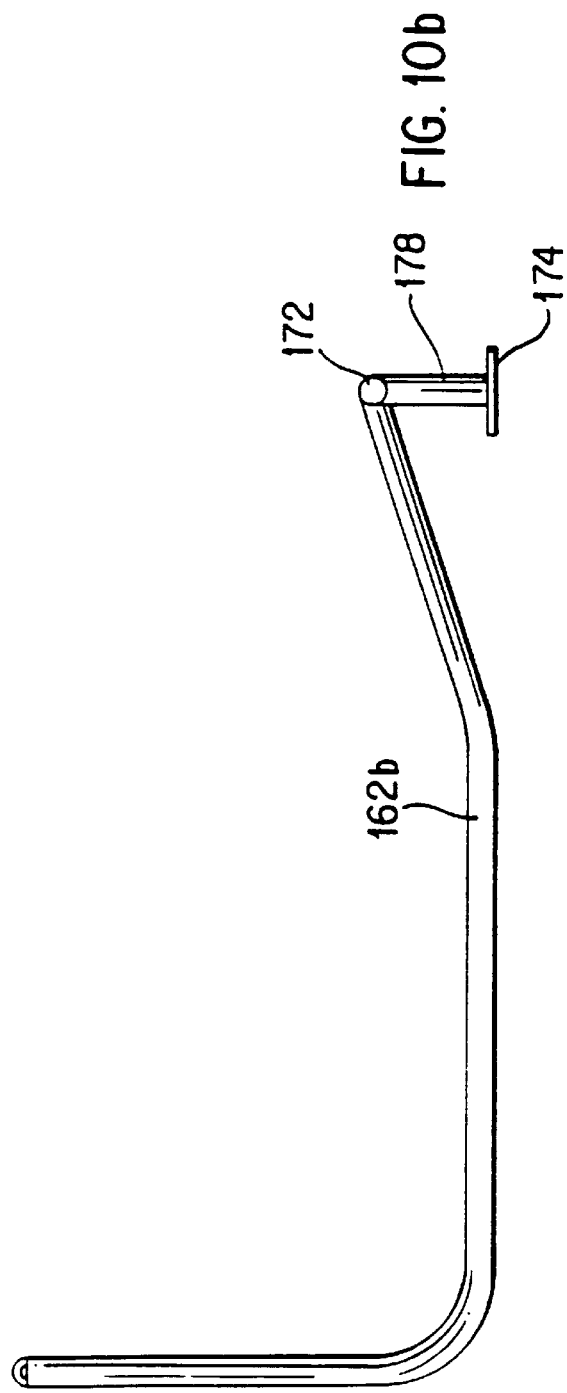

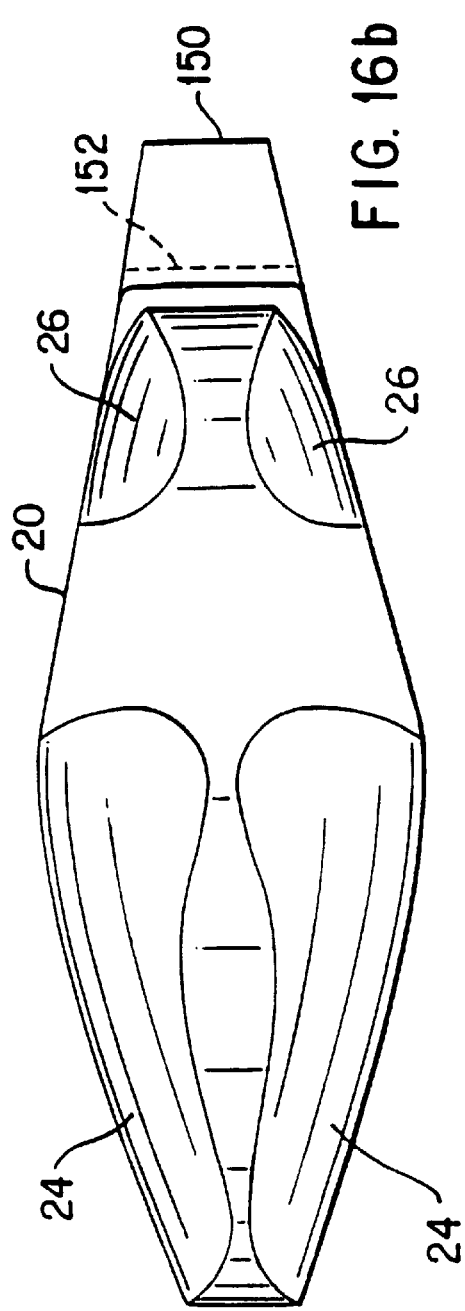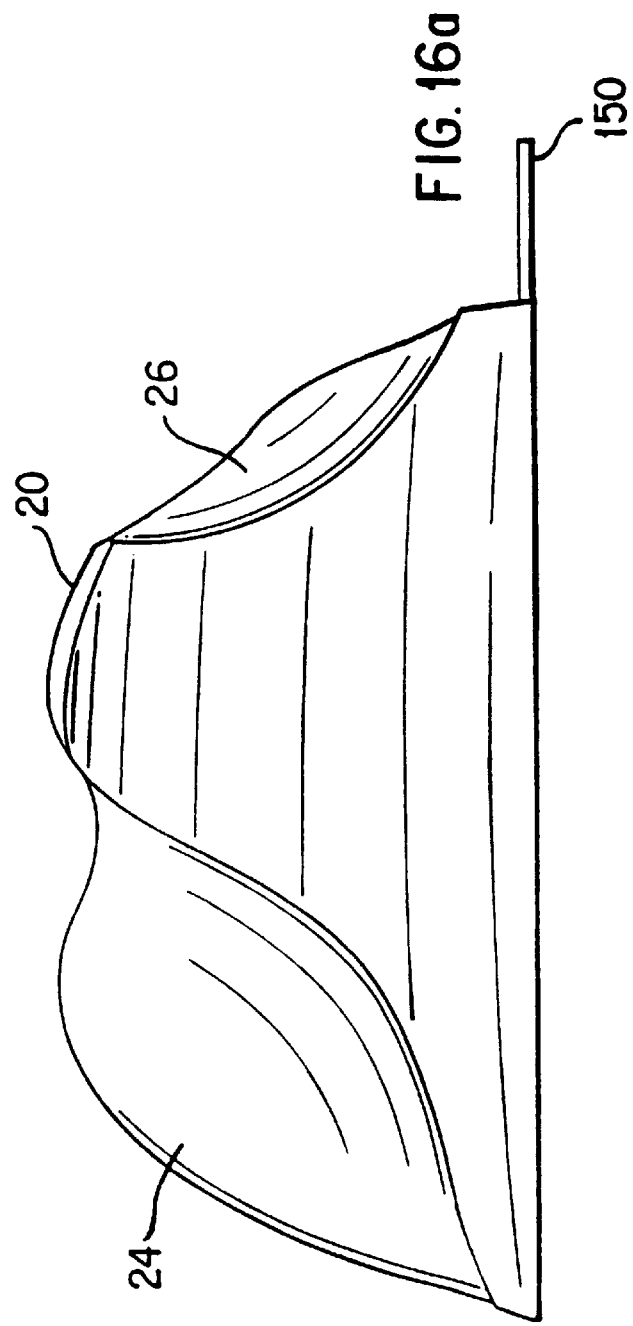

SMALL VEHICLE SECURITY DEVICE

This application is a continuation-in-part of U.S. Ser. No. 08/543,633 filed on Oct. 16, 1995, now abandoned, which is hereby incorporated by reference.

BACKGROUND OF THE INVENTION

1. Field of the Invention

The instant invention relates generally to structures for storing and protecting small vehicles, such as bicycles, motorcycles, snowmobiles, personal watercraft (such as Jet Skis), all-terrain vehicles and the like. More specifically, the instant invention provides protection from the environment, theft and vandalism and is a durable, versatile, economical solution to problems encountered in small vehicle storage.

As municipalities, transit authorities and others are confronted with increasing auto congestion, they are being forced to explore alternative modes of transportation, both voluntarily and by government mandate. Various states and municipalities have enacted legislation providing tax incentives encouraging investment in or mandating measures to increase transportation alternatives.

One alternative means of transportation is the use of bicycles. However, people that commute by bicycle encounter a number of problems, including where to store the bicycle and how to protect it from the elements. In addition, bicycles are targets for theft of both the bicycle itself or it components, and vandalism. Providing adequate bicycle storage and security is an important way of encouraging alternative transportation.

2. Description of the Related Art

Prior to this invention there existed no satisfactory protection for bicycles for use in public areas. Conventional bicycle locks leave the bicycle exposed to the elements and do not stop stripping of components such as seats, saddle bags, pumps, etc. In sophisticated bicycles, some mechanical components of the bicycle are worth hundreds of dollars and are the targets of thieves. In addition, a conventional bicycle lock will not stop a determined thief, especially if the bicycle is left unattended for a long period of time.

Devices which rely on conventional bicycle locks or similar devices and which fail to provide protection from the elements and vandalism are disclosed in the following references: U.S. Pat. Nos. 5,278,538 (Ainsworth et al. 1994), 4,433,787 (Cook et al. 1984), 4,379,393 (Schott et al. 1983), 3,989.327 (Candelaria 1976), 3,827,773 (Aiello 1974) and 3,762,569 (Spring 1973).

A device which relies on a conventional bicycle lock to deter theft is disclosed in U.S. Pat. No. 4,080,020 to Candelaria (1978). In its alternative embodiment Candelaria provides a cover element to provide further protection from theft and the elements. However, the cover in Candelaria protects only the top half of the bicycle, leaving at least the bottom half exposed to the elements. Further, the bicycle remains susceptible to vandalism and theft of components.

Various shipping containers for bicycles are disclosed in U.S. Pat. Nos. 4,991,715 (Williams 1991), 4,792,039 (Dayton 1988) and 4,378,883 (Profeta 1983), but these devices are limited to transporting bicycles. These devices do not address the requirements of bicycle commuters or those which need storage for only a short period, such as shoppers or those on errands, because the devices require the disassembly and subsequent reassembly of the bicycle.

The storage device disclosed in U.S. Pat. No. 3,734.272 to Galen (1973) is an indoor storage and shipping container, which fails to address the problems of security in public places because it is not designed for outside use or to be affixed to a specific site.

Protection from the elements is provided by soft bicycle covers such as those disclosed in U.S. Pat. Nos. 5,282,502 (Ballard 1994), 4,976,389 (McLellan et al. 1990), 4,715,646 (Goffi et al. 1987), 4,356,831 (Adams 1982), 4,009,744 (Joslyn 1977) and 3,968,913 (Weed et al.). However, these devices provide no more protection from theft than conventional bike locks and are not solutions to problems encountered by a community or business seeking to encourage bicycle commuting by providing storage.

The collapsible bicycle storage container assembly disclosed in U.S. Pat. No. 4,352,363 to Wilson (1982) is similar to the soft bicycle covers discussed above, with the inclusion of a frame for supporting the bicycle. Again, this device does not address the problems of storage of bicycles and, because of its construction, appears to be a shelter from weather, rather than a viable deterrent to theft or vandalism.

Enclosed rectangular bike lockers, such as those available from CYCLE-SAFE, are an attempt to address the needs of bicycle commuters for storage and protect bicycles from theft, vandalism and the elements. Lockers are also disclosed in U.S. Pat. Nos. 3,949,528 (Hartger et al. 1976) and 3,967,425 (Wolverton et al. 1976). However, bike lockers have several design weaknesses. Bike lockers are expensive to fabricate, install and maintain. Lockers require a permanent concrete pad foundation which sometimes require permits. Bicycle lockers are inefficient in use of space, in as much as they can only be configured in one specific pattern away from walls and other obstacles. In addition, once a number of bike lockers are configured, they cannot be rearranged without significant expense. This configuration adaptability is lacking due to the lockers' rectilinear shape, shared common wall and the requirement of a level foundation.

Maintenance of the lockers is costly because the metal or fiberglass surfaces which make up the locker are prone to abuse and graffiti. Aesthetically, the lockers have a sterile presence due to their box-like walls. Furthermore, lockers are not easily replaced.

Lockers also can be safety hazards because of their design. Lockers create a series of long, contiguous walls approximately four feet in height, which allow an individual to be easily concealed from clear line of sight, which is a concern at night or in a high crime area.

In addition, illicit activities have been known to take place in bicycle lockers. Because the lockers offer shelter which is completely closed from sight, lockers have a propensity for use for storing drugs and as a place to hide bombs. Some lockers have been appropriated by the homeless for use as shelter.

U.S. Pat. No. 3,861,092 (Dale et al. 1975) discloses a Molded Storage Housing for a Motorcycle. This device includes a housing structure for storage of motorcycles and the like, comprising a cover pivoting about a floor plate. Like conventional bike lockers, the Dale device completely closes and seals the contents from sight. In addition, the floor plate of Dale fails to align and support the motorcycle being stored in an upright manner. It is necessary for the vehicle stored in the Dale device to have a support mechanism of its own, such as a kick stand. Finally, the cover disclosed in Dale is, because of its design, heavy and hard to lift.

There is therefore a present need for a suitable storage assembly which encloses and protects a bicycle from the elements while at the same time reducing the possibility of theft or vandalism. Similar problems are encountered by the owners of other small vehicles, such as motorcycles, personal watercraft (such as Jet Skis), snowmobiles, etc. Further, it is desirable that the storage device be inexpensive, durable, pleasing to the eye and capable of being arranged in such a way that large numbers of the devices can be placed in a limited or unusually shaped area for most efficient use of space. A device of the type disclosed in the instant specification will allow a community or business to provide storage facilities for bicycles, thus encouraging the use of bicycles for transportation. In addition, the device disclosed herein is suitable for private use by home or apartment dwellers without suitable storage space for small vehicles.

OBJECTS OF THE INVENTION

An object of the present instant invention is to provide an inexpensive, durable, storage device which protects small vehicles from the elements, theft and vandalism.

Another object of the present invention is to provide a storage device which can be installed anywhere a conventional bike rack can be installed, in a variety of space saving configurations. The instant invention can be configured to meet the requirements of a particular site. The instant device can be installed in circular, staggered and straight line configurations, as well as wall mounted or angled.

Another object of the instant invention is to provide a modular design which allows for quick and economical replacement of damaged parts rather than the entire unit as with conventional bicycle lockers.

Another object of the instant invention is to provide a protective cover for small vehicles that can be used on any surface, with or without a base structure.

Yet another object of the present invention is to provide a device which has an aesthetically pleasing design.

Another object of the present invention is to allow ease of monitoring use thus preventing illicit activities and problems in high crime areas. Since the instant devices are individual freestanding units, it makes it relatively difficult for someone to conceal themselves behind one.

Another object is to minimize vandalism to the storage unit by providing a plastic shell which is impact resistant and resistant to paints or inks.

SUMMARY OF THE INVENTION

In accordance with the present invention, a device is employed for the storage and protection of bicycles and other small vehicles which comprises a shell and a base structure. The shell opens and closes around a pivot point. In one embodiment the shell is mounted to the frame by a hinging means so the shell can be lifted with respect to the base to allow the vehicle to be placed in the device and to allow access to the vehicle. The shell is lowered to encapsulate the vehicle and the vehicle can be secured by locking the shell or by locking the vehicle to the base structure. The preferred plastic shell is an economical and durable cover.

Another embodiment of the present invention relates to the shell for use with or without a base structure. A shell structure is placed over an existing surface and used to protect a small vehicle from the elements and/or theft. The shell opens up and closes about a pivot point.

BRIEF DESCRIPTION OF THE DRAWINGS

FIG. 7 is a side view of the second embodiment of the inventive security device in the open position.

FIG. 8a is a plan view of a second preferred embodiment of the base structure of the inventive security device.

FIG. 8b is a side view of the second preferred embodiment of the base structure of the inventive security device.

FIG. 10a is a plan view of another preferred embodiment of the base structure of the inventive security device.

FIG. 10b is a side view of another preferred embodiment of the base structure of the inventive security device.

FIGS. 16a and 16b are, respectively, side and plan views of an embodiment of the shell portion of the inventive security device illustrating an alternative pivot point mechanism.

DESCRIPTION OF THE PREFERRED EMBODIMENTS

There are various embodiments of the security device for small vehicles which would be encompassed by the instant description and following claims. Preferred embodiments are described in more detail below. In addition to the described base structures, other structures can be used in connection with the shell to enclose and protect the small vehicle. In some cases, no base would be needed and the shell could be used alone.

Figure 1:
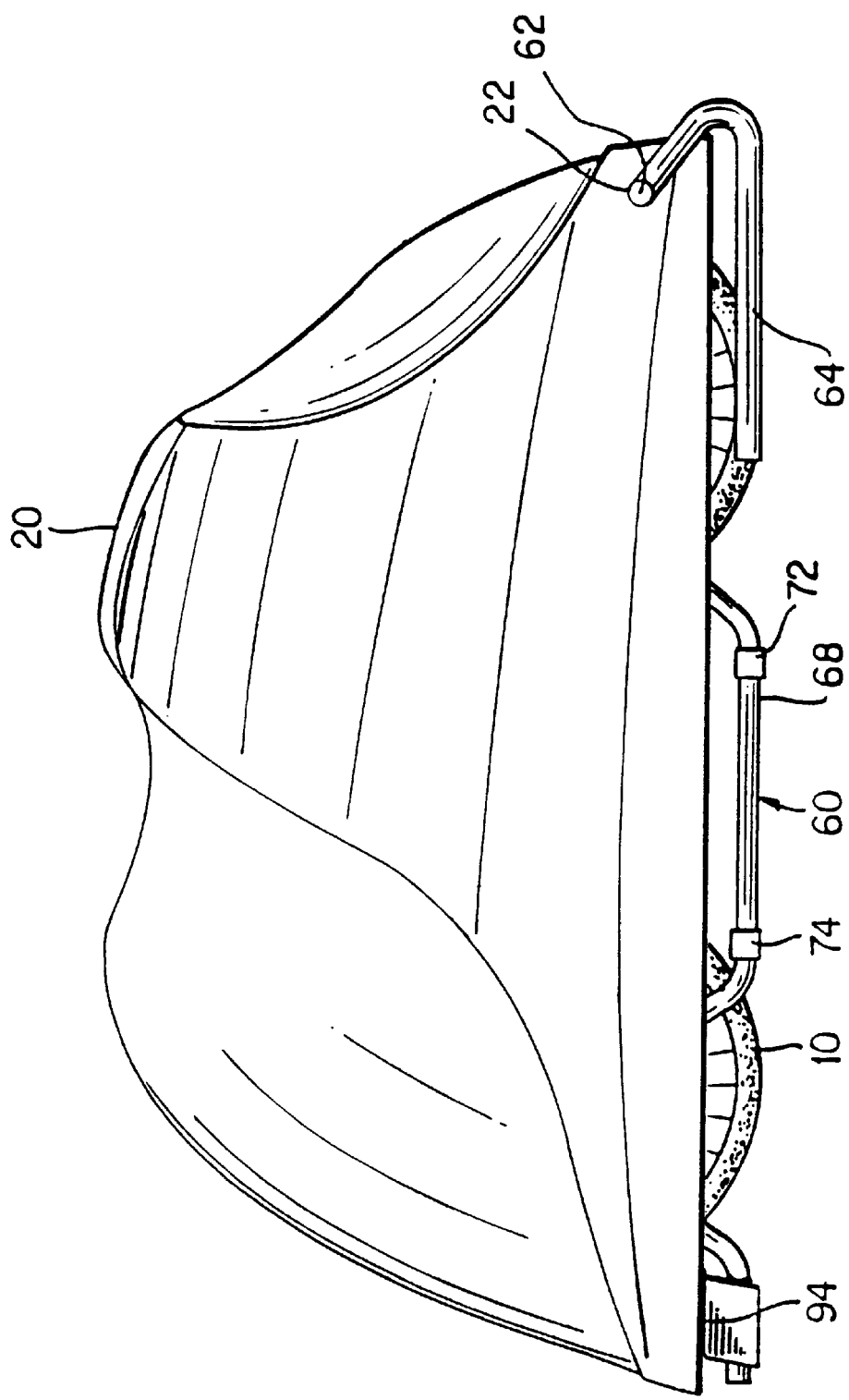
FIG. 1 is a side view of a preferred embodiment of the inventive small vehicle security device in the closed position.

Turning first to FIG. 1, a preferred embodiment of the inventive security device is illustrated in the closed position. Lid or shell 20 encloses bicycle 10, protecting the bicycle 10 from theft, component theft, vandalism and the elements. In this preferred embodiment the bicycle 10 is supported by base structure 60. Shell 20 has holes 22 through which the horizontal axis member 62 of the base 60 is inserted. The shell 20, the base structure 60 and how these two components interact are described more fully below.

Figure 2:
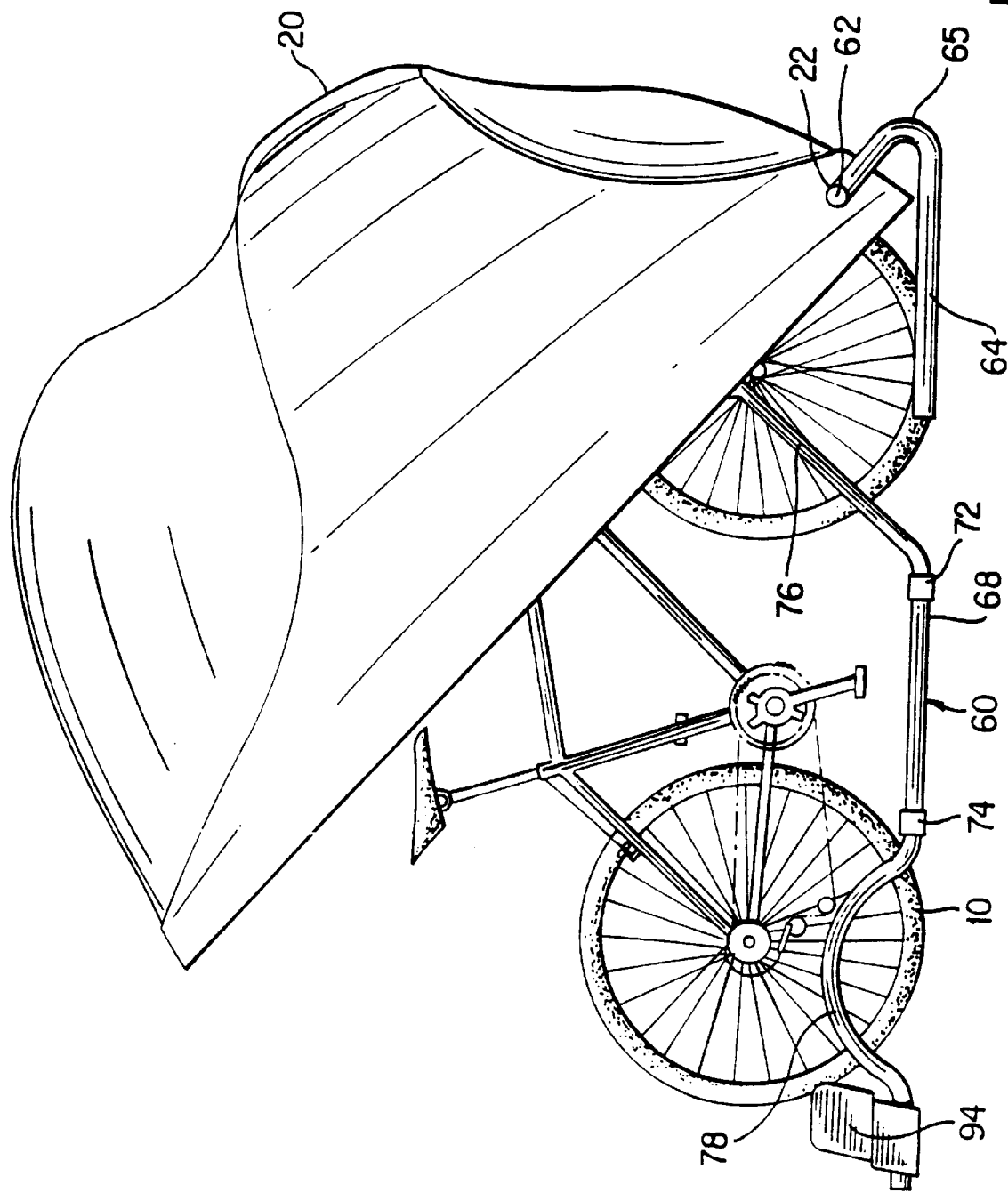
FIG. 2 is a side view of the inventive security device in the open position.

FIG. 2 illustrates the preferred embodiment of the inventive security device with the shell 20 in the open position. The shell 20 rotates at holes 22 around the horizontal axis member 62, thereby allowing easy access to the bicycle 10. The hinging mechanism which allows raising and lowering of the shell 20 is described more fully below. There may also be mechanisms (not shown) which the practitioner will readily appreciate may be used in association with the shell to ease and/or restrict its motion or ease of motion.

Figure 3C:
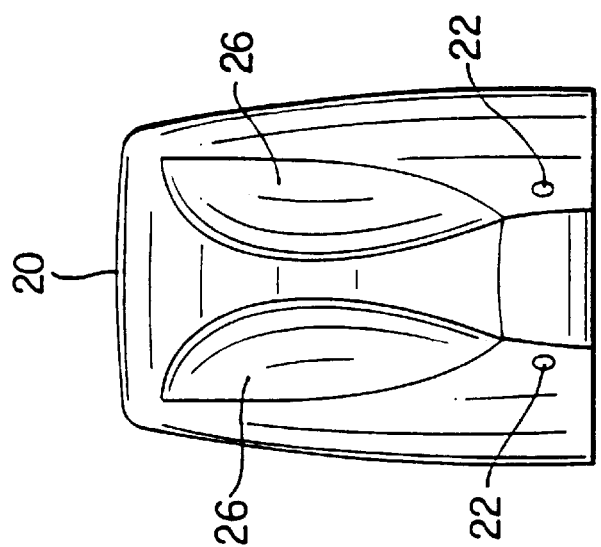
FIGS. 3a, 3b and 3c are, respectively, side, plan and front views of the shell portion of the inventive security device.
Figure 3B:
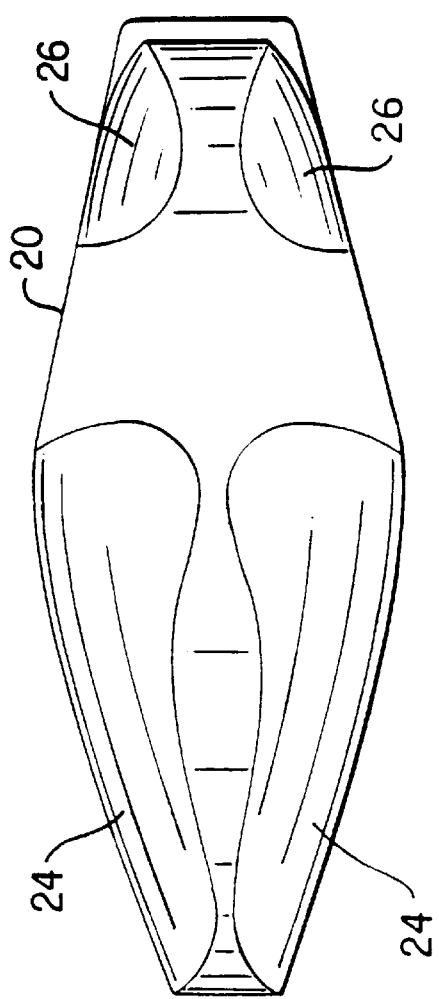
Figure 3A:
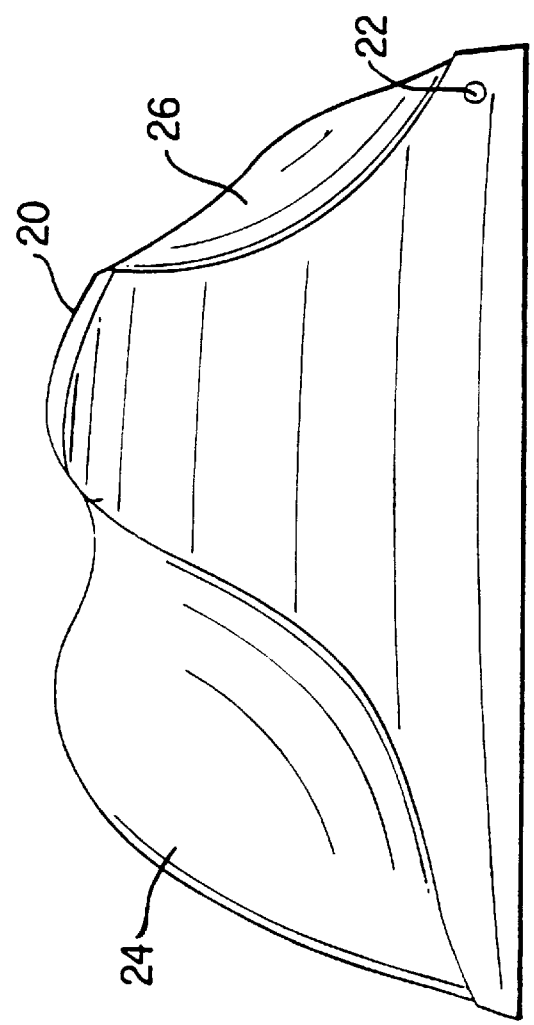

Turning now to FIGS. 3a–c. the lid or shell 20 is illustrated at different perspectives. The shell 20 is formed to enclose a small vehicle such as a bicycle to protect it from vandalism and theft and shield it from the natural elements. It is preferred that the shell 20 only substantially enclose the small vehicle, as shown in FIG. 1, in order to allow the inspection of the interior of the unit, to avoid the illicit use of the unit as described above. In a preferred embodiment, the shell 20 has holes 22 which allow the connection of the shell 20 to the base 60 and also allows the shell 20 to be rotated around the horizontal axis member 62 so that the shell 20 can be raised and lowered over the vehicle to be protected. Additionally, the shell 20 can be provided with view holes (not shown) in the body of the shell 20, which would allow inspection of the interior.

Plastic is an appropriate and preferred material for creating a large volume shell 20. It is an extremely durable substance, an important quality for this application, and is capable of resisting the elements and providing security for the vehicle to be protected. Plastic is also vandalism resistant. The preferred plastic is polyethylene, which has high compression and tension strength relative to its mass, making it extremely impact resistant. Polyethylene is also virtually impervious to paints, inks and dies, an important quality when graffiti is a concern.

Materials such as fiberglass and other composite materials may be used to construct the shell. It is also apparent that other materials may be used, such as metal or wood or other materials that will be apparent for substitution, although at present time these are considered less durable. The choice of material for the shell depends on the criteria of durability, resistance to elements and weight constraints. The weight of the material is an important factor to consider when choosing the location of the pivot point for the shell. Additionally, the lift assist means, described below, can also be used to assist in opening and closing the shell if necessary.

Figure 15C:
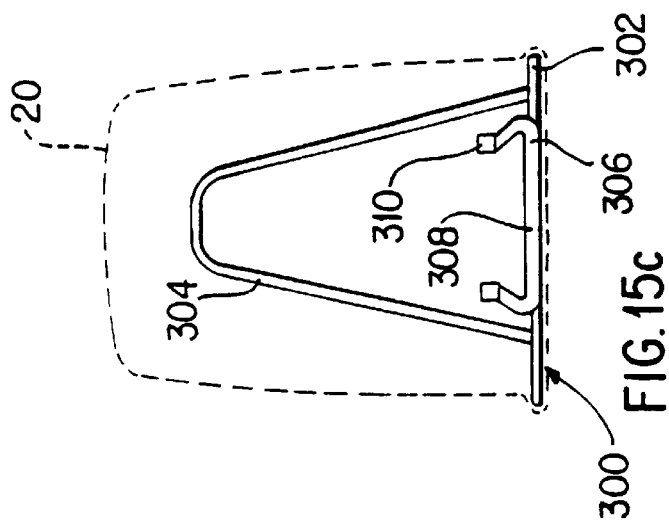
FIGS. 15a, 15b and 15c are, respectively, side, plan and front views of a structure used to support and reinforce the shell portion of the inventive security device.
Figure 15B:
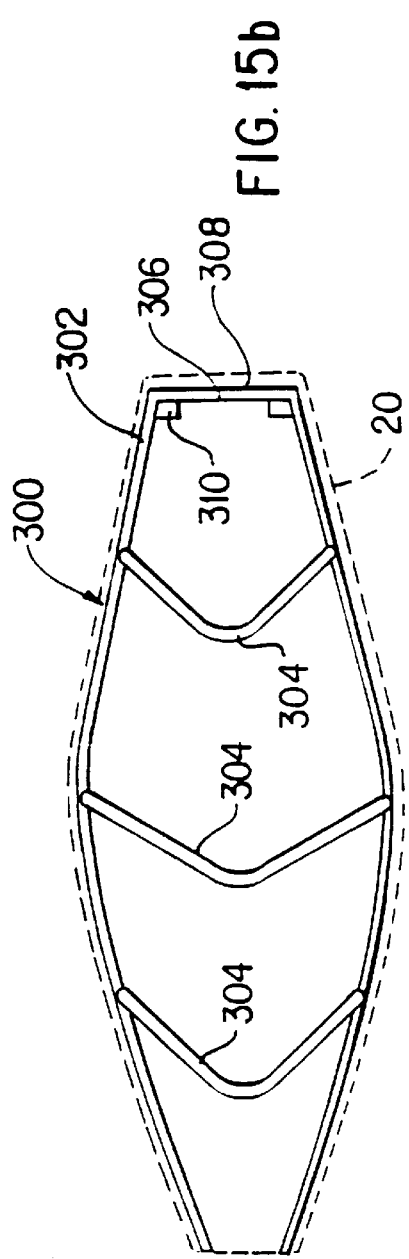
Figure 15A:
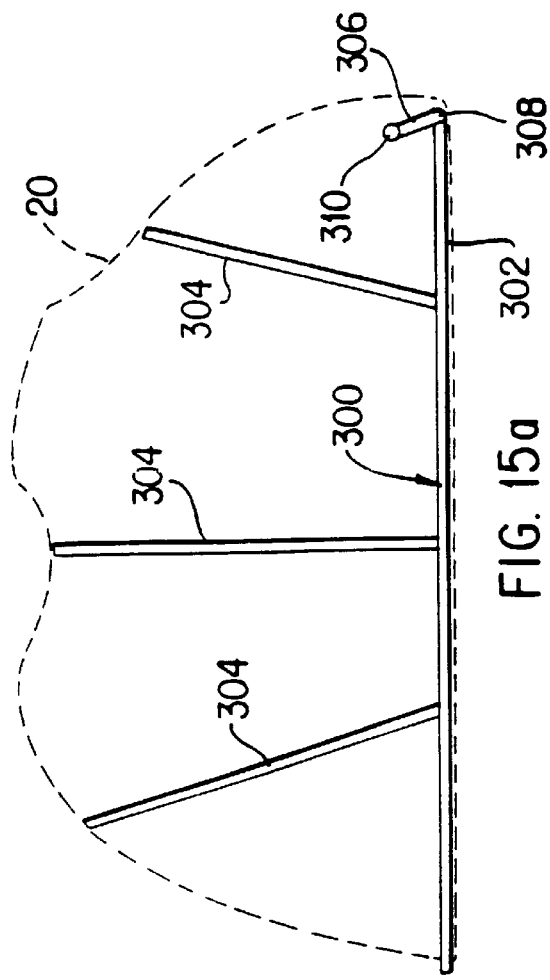

The shell can also be reinforced by various methods in order to impart strength. As illustrated in FIGS. 15a–c, bars of various materials can be implanted in the shell wall in order to frustrate efforts by thieves to cut through the shell with blades or other means. FIGS. 15a–c illustrate the shell of the inventive security device with structural support 300, either embedded in the shell, or alternatively, used as a structural support about which the shell 20 is built. The shell 20 in this illustration is drawn in broken lines in order to allow illustration of the structural support or cage 300. The structural support or cage 300 is especially useful in situations where the shell 20 is to be used without a base structure 60, as illustrated in FIG. 1. In addition to adding support to the shell 20, the structural support or cage 300 adds another layer of protection by covering the small vehicle with a cage, separate and apart from the shell 20. Therefore, even if the shell is removed, the vehicle is still secure.

The structural support or cage 300, in its preferred embodiment, comprises a base rod 302 which is embedded in or is enveloped by the bottom of the shell 20. This base rod can be a unitary piece, or separate pieces configured in a way in order to impart structural support and shape to the shell 20. Extending out from the base rod 302 are one or more cross pieces 304 on which the top of the shell 20 rests. Alternatively, the cross piece 304 is embedded in either the side or top of the shell 20, or both, which allows it to impart structural strength and support to the shell 20. Front support 306 provides additional support to one end of the shell. The front support 306 also provides a surface at rod 308 about which the shell 20 can pivot when it is raised or lowered. Front support 306 can be attached to a cross axis, as discussed below, by collars 310. Collars 310 allow the structure to rotate about the cross axis.

The shell can also be impregnated with various substances known to those skilled in the art prior to the molding process or applied to the shell during the manufacturing process. These additions can impart desired qualities to the shell, including added strength and fire resistance.

Molded, recycled plastic currently is the most economical means of producing a durable complex shell form and meets the above mentioned design criteria of strength, shape, weight and cost. In the preferred embodiment, the design of the shell 20 employs compound or opposing curves to structurally maximize its strength—as it is known and understood by those involved in plastics and materials design. Compound curves are used to make the shell 20 structurally stronger than a flat plane. The strength of a curved plane is maximized within certain dimensions in reaction to certain forces. Compound curves give the surface multidimensional rigidity and strength while minimizing material. The specific curves used in a shell for a given utility depends in part on the shape and size of the vehicle to be stored and may be selected according to the aesthetic choice of the designer.

As illustrated in FIGS. 3a–c. the amount of material to make shell 20 may be minimized, without sacrificing strength through the molding of portion 24 and 26 of the shell which cause the curvilinear design to be an efficient use of space. Portions 24 and 26 can be made to bow outwardly from the interior of the shell 20, bow inwardly towards the interior of the shell 20 or can be a combination of both. This allows a number of the inventive devices to be clustered tightly together, thus maximizing the number of units that can be installed within a given site. When not in use, the design of the shell 20 also allows multiple shells to be nested within one another to effectively reduce shipping volumes. The design of the shell 20 and its curved form may be selected to provide an efficient shape for the molding process and allow for easy mold release.

Compound or opposing curves used to impart strength and lower strength-to-material weight ratios are discussed in various other patents unrelated to the subject matter of the present invention. For example, U.S. Pat. No. 5,121,741 to Bremer et al. discloses the use of compound curves to enhance the strength and structural rigidity of a vest, thus allowing the vest to be formed of reduced material and weight. Other patents which teach the use of compound curves to impart strength and structural rigidity, while allowing for reducing the amount of materials used, include U.S. Pat. Nos. 5,123,514 (fan blade), 5,323,956 (bowl), 4,156, 706 (fan cylinder), 3,631,831 (concrete structures), 3,616, 141 (honeycomb structures) and 3,591,864 (goggles).

Figure 14A:
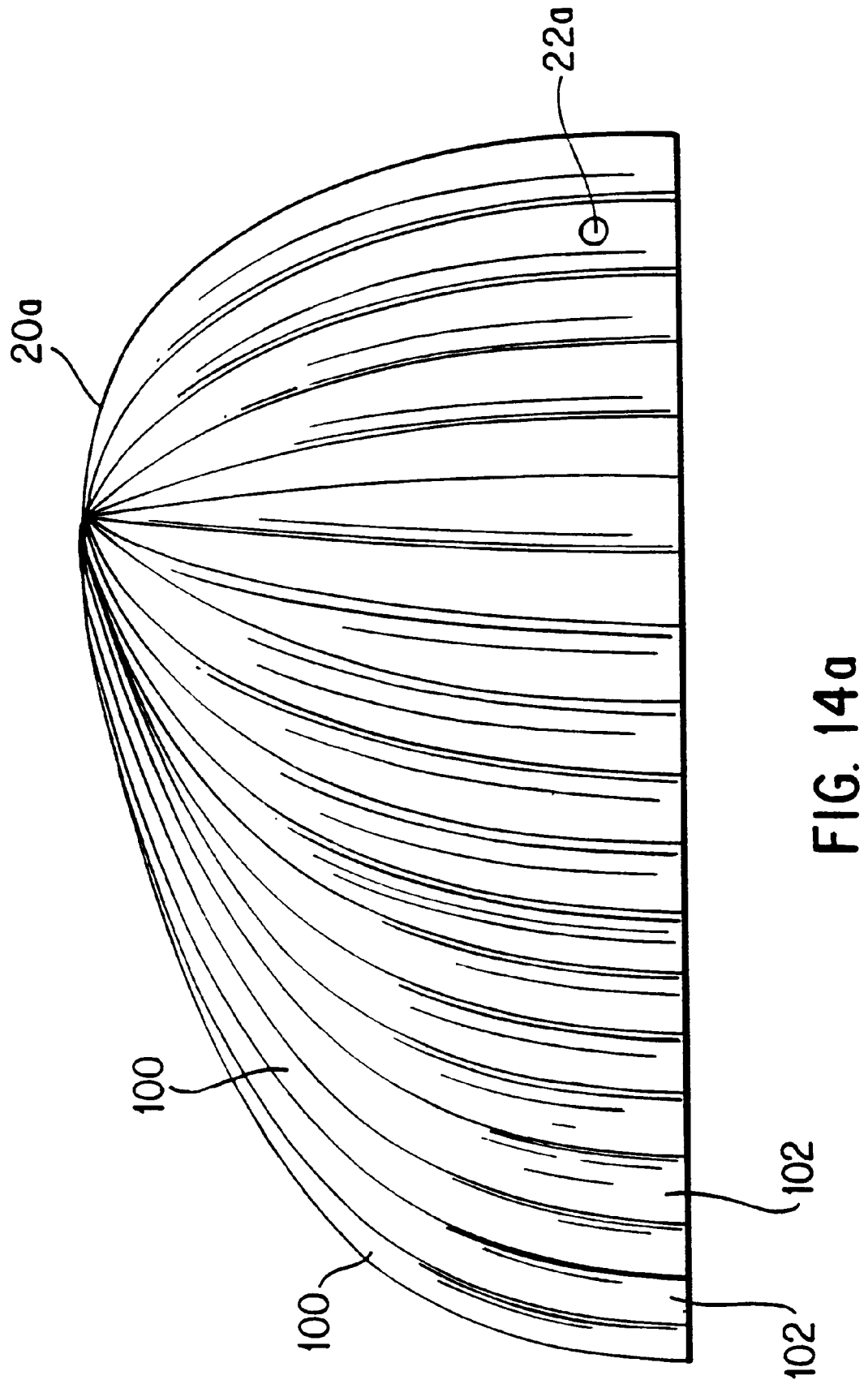
FIGS. 14a–c are alternative preferred embodiments of the shell portion of the inventive security device.

In addition to the shell illustrated in FIGS. 3a–c, FIGS. 14a–c illustrate embodiments of the shell having compound curves. FIG. 14a illustrates shell 20a with hole 22 through which the horizontal axis member of the base 60 is inserted, one of the preferred embodiments for the lowering and raising of the shell 20a. Shell 20a has a series of portions 100 and 102 which act as opposing or compound curves as discussed above. Portions 100 and 102 can either alternate between bowing inwardly or bowing outwardly, or can be any combination of areas bowing outwardly or inwardly.

Figure 14B:
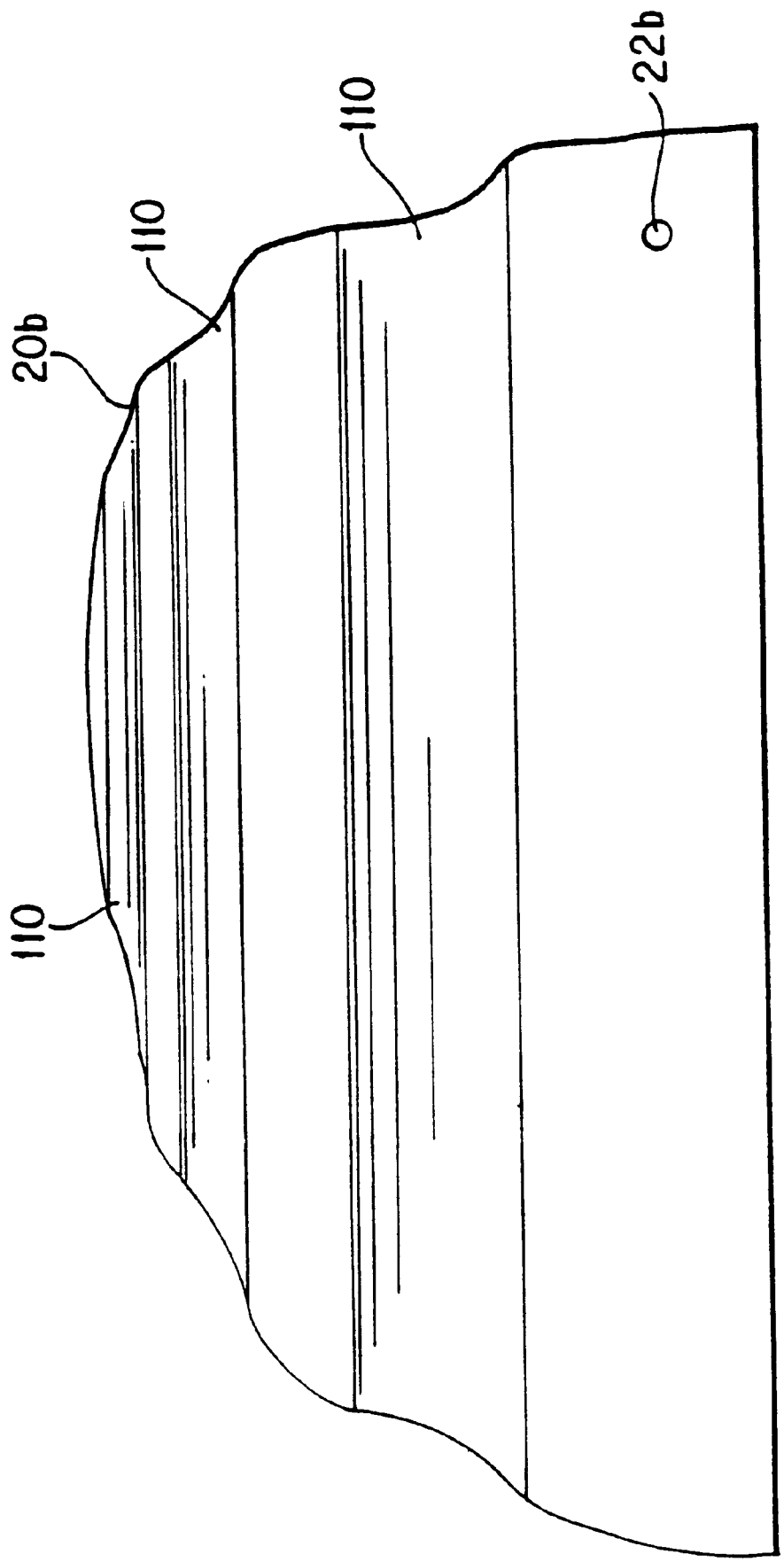
Figure 14C:
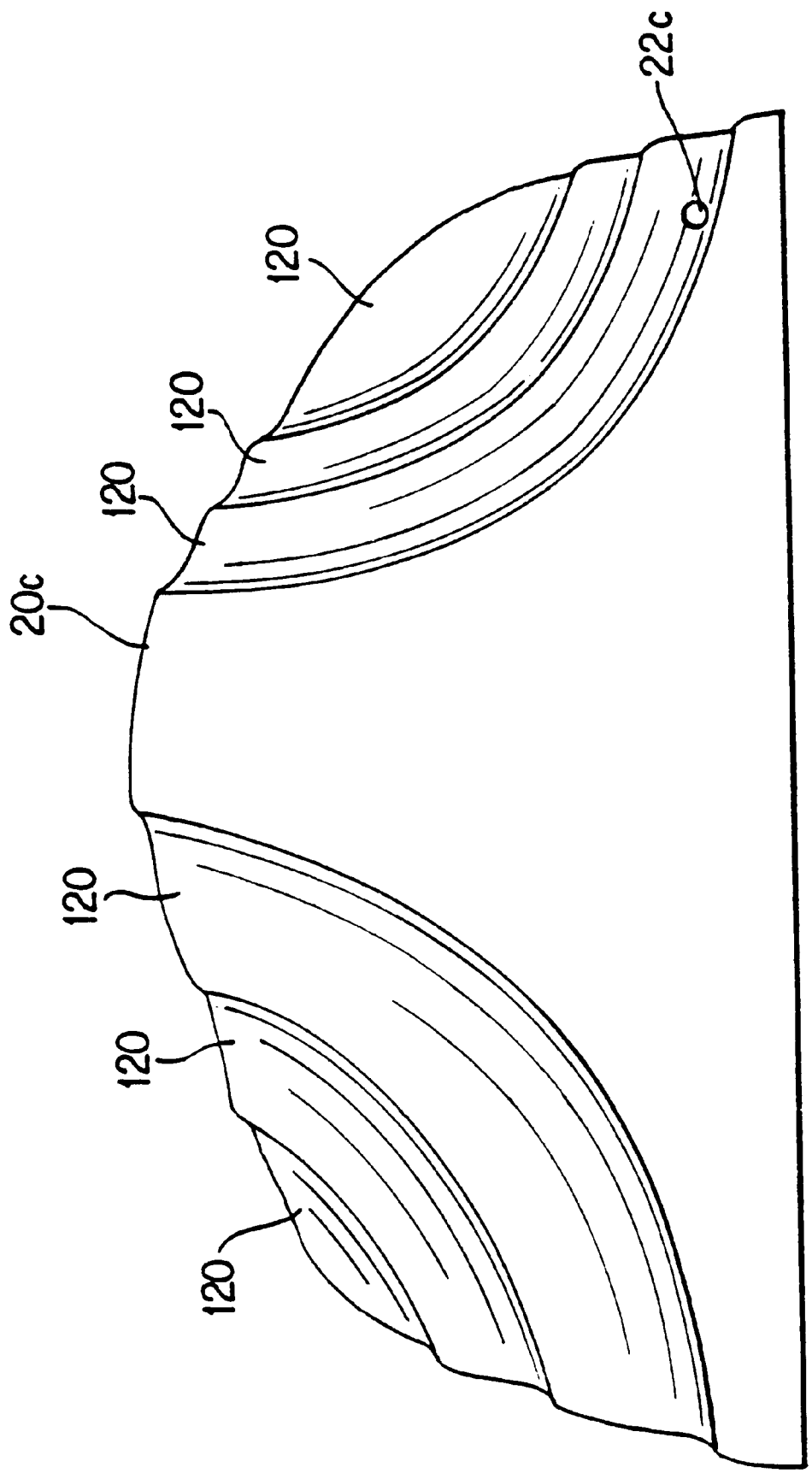

FIGS. 14b and 14c have other areas 110 and 120, respectively, which also impart strength and structural rigidity in the method of compound curves. Each of the illustrated shells 20a–c can be used with any of the bases described herein, or any of the other possible pivot points contemplated.

The design of the shell 20 reflects the shape of the vehicle inside and different designs would be employed for vehicles such as motorcycles, snowmobiles and personal watercraft (such as Jet Skis). Other embodiments would have analogous geometric compositions utilizing compound curves to provide rigidity to the shell structure and vary in their proportions as to accommodate the design of the vehicle inside. In addition, the shells and bases can be adapted to protect more than one vehicle at a time.

Figure 6:
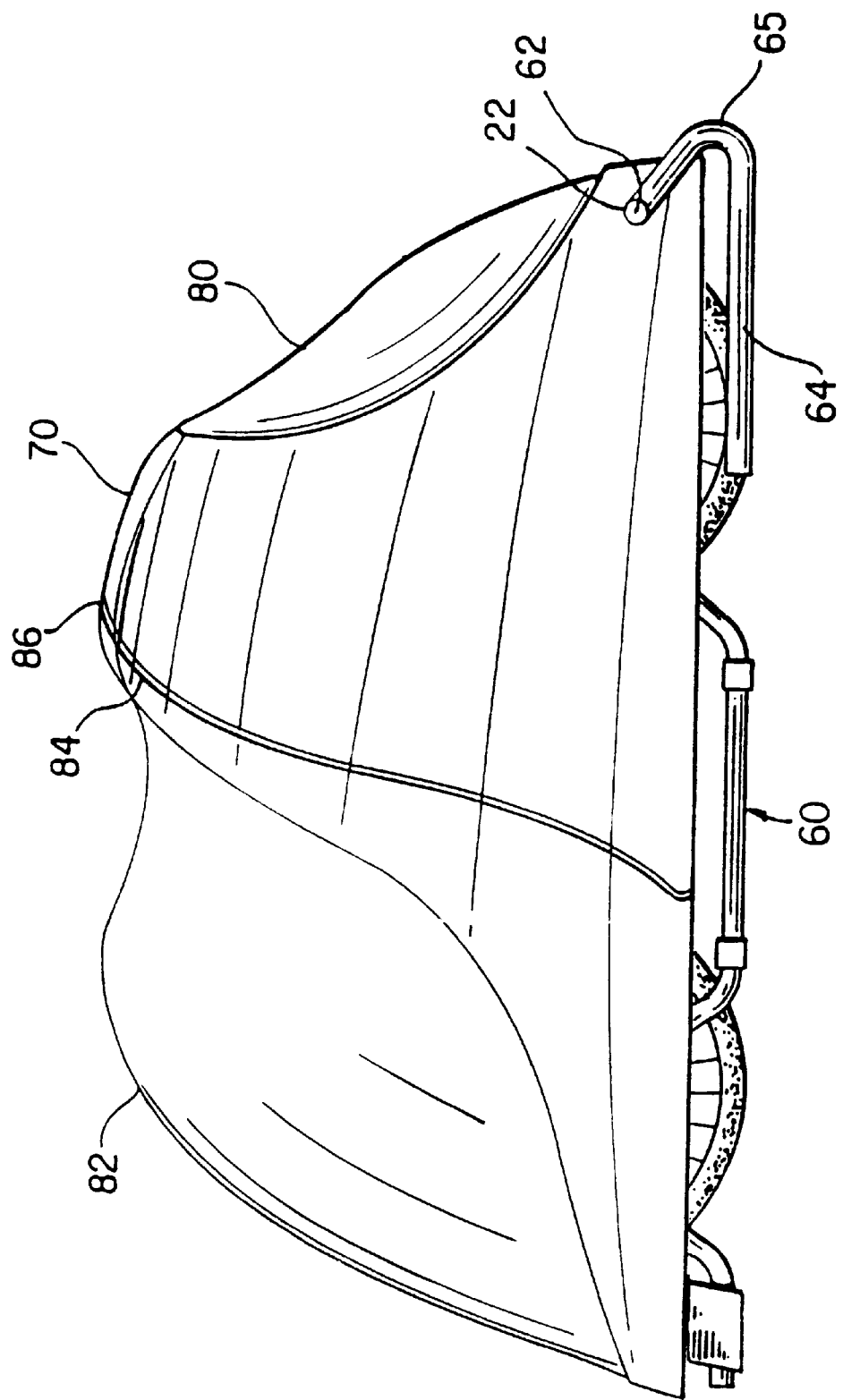
FIG. 6 is a side view of a second embodiment of the inventive security device in the closed position.

Another preferred embodiment of the shell is illustrated in FIGS. 6 (closed) and 7 (opened), in which the shell 70 is comprised of a front portion 80 and a back portion 82, split at center parting line 84. Each of the embodiments illustrated in FIGS. 14a–c can be adapted to this manner of use. This embodiment opens and closes at pivot point or hinge 86. This design allows the front portion 80 to stay fixed to the base 60 while the back portion 82 is opened for access to the vehicle 10. This embodiment is shown in the open position in FIG. 7. The back portion 82 is hinged to the front portion 80 at the hinge or pivot point 86. Any hinge known to those skilled in the art can be used to hinge the front portion 80 to the back portion. Other pivot points can be used to attach the two portions and allow the shell to open and close easily. For example, by moving the pivot point towards the center of the shell's gravity, it would reduce the force needed to lift the shell. This embodiment would be particularly advantageous with a vertical wall installation of the base, which is also more fully explained below.

Although FIGS. 6 and 7 reflect a two-part shell, it will be readily appreciated that this embodiment would also apply to a shell having more that two pieces.

As stated above, in addition to the hinging means described above, the shell 20 can be opened and closed about many other types of pivot points. For example, one end of the shell 20 can be secured to the ground or the wall by a method, such as bendable elastic or plastic materials that would permit the shell to pivot at that point. This embodiment is illustrated in FIGS. 16a and b.

As shown in the plan view of this embodiment of the shell portion, FIG. 16b, the shell 20 is attached to the ground or wall surface by sheet 150. The sheet 150 can be made partially or wholly of a rubber or plastic material which allows the shell 20 to pivot between the open and closed position. One embodiment would provide a crease 152 about which the shell 20 would pivot. This embodiment can be used with or without the base structure. Alternatively, lift assists, such as described below, can be used to ease the lowering and closing of the shell 20.

Many base structures are available to be used in connection with the shell of the instant invention. In fact, it is possible to utilize the shell without a base structure and rather in conjunction with the ground or floor and still be within the coverage of the instant invention. Flat concrete slabs and multiple piece bases are contemplated for use with the shell. Many bases that could be used with the instant shell are illustrated in the art of record, but have shortcomings that can be overcome through the use of the preferred bases, described in more detail below.

Figure 4:
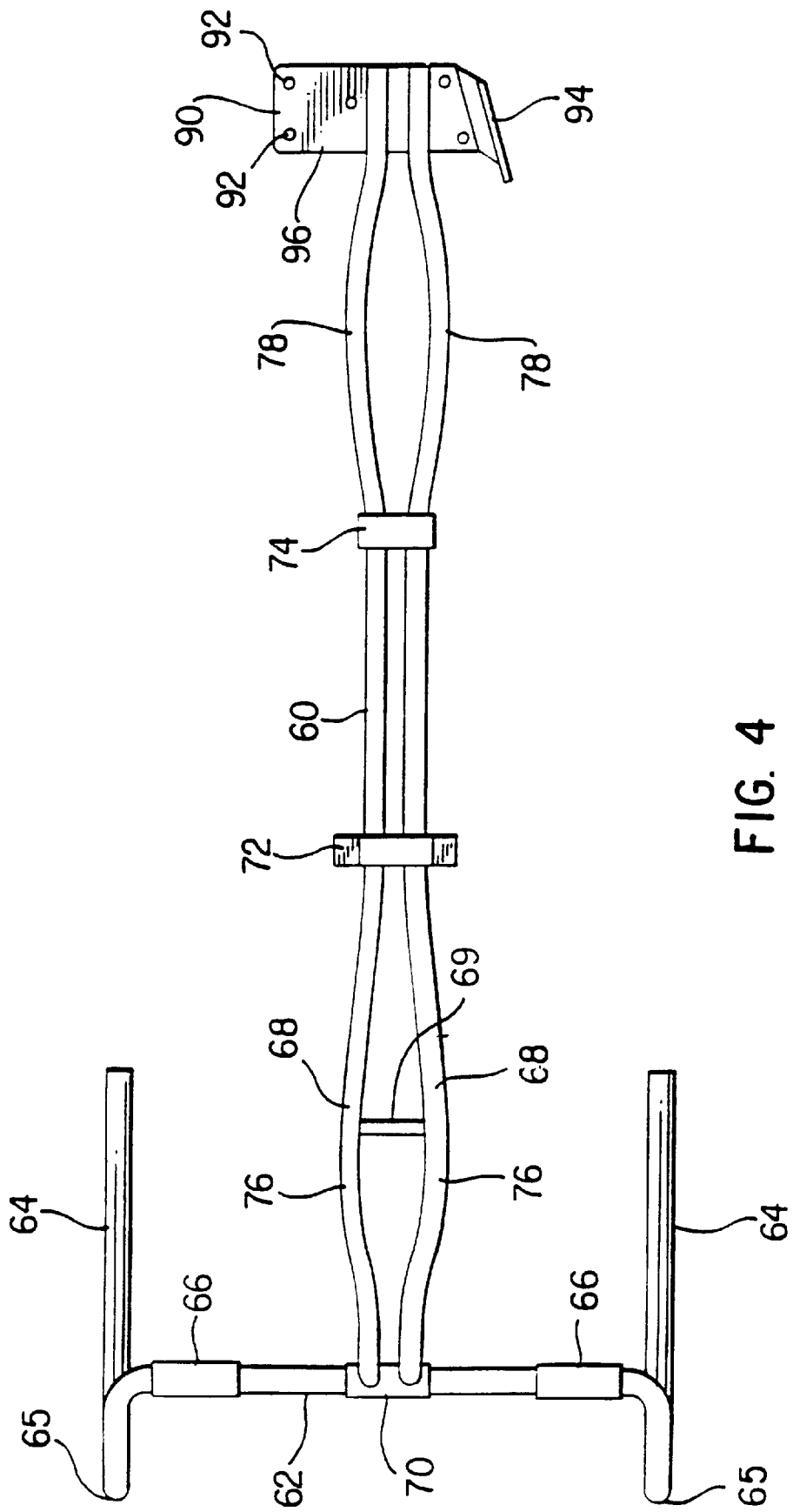
FIG. 4 is a plan view of the base structure of the inventive security device.
Figure 5:
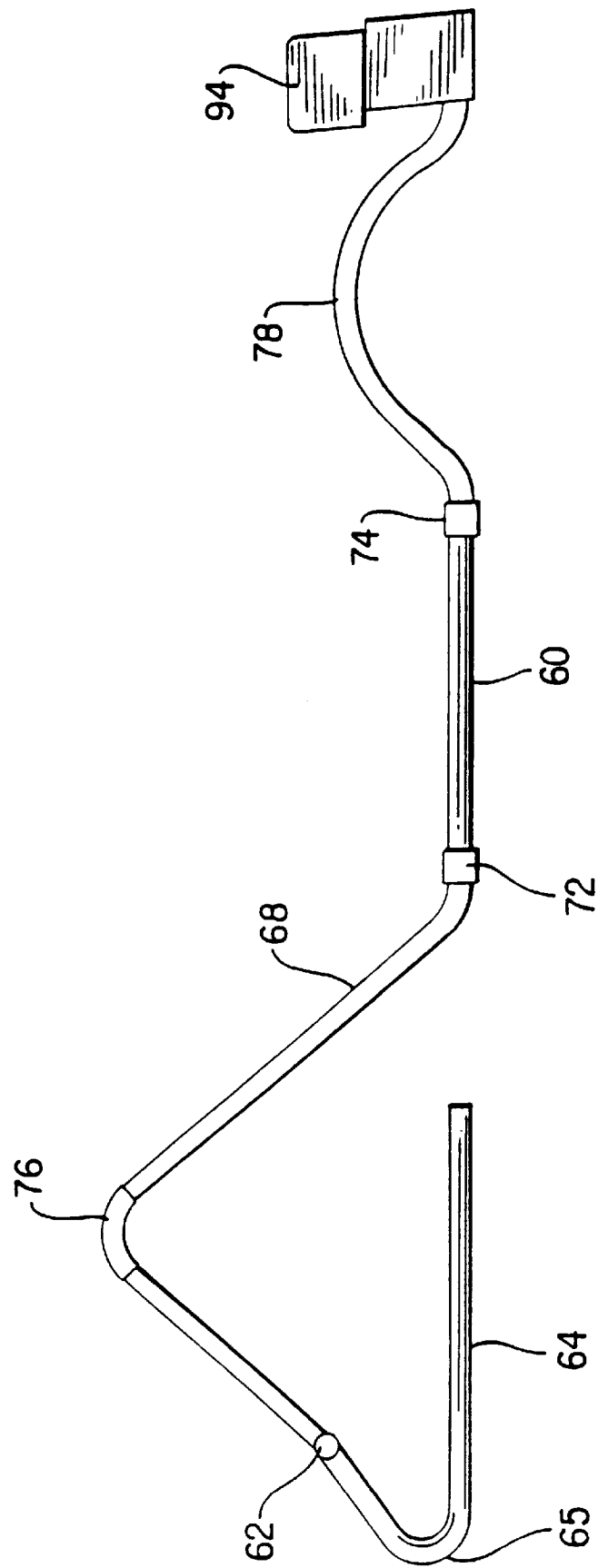
FIG. 5 is a side view of the base structure of the inventive security device.

In one preferred embodiment, the base 60 is illustrated in a plan view in FIG. 4 and a side view in FIG. 5. The function of the base 60 is to support the shell 20, allow the locking of the shell 20 to the base 60 and to align the bicycle or vehicle and allow a bicycle to stand upright when it is stored in the inventive device.

The base 60 is preferably made of linear tubing and plate metal stock, preferably stainless steel, and treated with an appropriate weather coating (i.e., galvanizing, powder coal, or baked on enamel). Alternatively, plastic can also be used as a base material.

The first primary component of the base 60 is a horizontal axis member 62, or cross piece, which acts as the central spine of the base 60. The horizontal axis 62 also has legs or anchor points 64, which, when assembled with the shell 20 extend out from the shell 20 and provide a stable support for the inventive device and the bicycle contained therein. The legs or anchor points 64 are preferably fixed to the axis 62 by portions 65 which can be elbow shaped tubing or another configuration depending on the design of the base 60. The legs 64 also allow the individual unit to be ganged together with other units. The hinging mechanism 66 is mounted on the horizontal axis 62 and attaches the shell 20 to the base 60.

One preferred hinging mechanism is a section of tubing 66 sleeved over horizontal axis 62. The shell 20 is attached to the tubing 66 which rotates about the axis 62. Alternatively other preferred hinges would be spring-loaded or pneumatic hinges which would ease the opening and closing of the shell. In addition, hydraulic or pneumatic struts, counterbalancing and elastics are other possible mechanisms, such as torsion bars, tension springs, compression springs and torsion springs and leaf springs that would aid in the lifting and lowering of the shell about the pivot point. These hinges would allow the easy lowering and closing of the shell and constant resistance if desired. The hinges could also provide resistance to closing of the shell without application of external force.

The preferred location of the hinging mechanism or pivot point is toward the front end, attaching the shell 20 to the horizontal axis member 62. Other possible locations for the hinging mechanism or pivot point include the rear end of the shell or at the center parting line 84 of the alternative embodiment illustrated in FIGS. 6 and 7. In this embodiment it is possible for the base 60 to be mounted on a vertical wall, thereby allowing the most efficient use of space. In order to allow use in the vertical wall preferred embodiment, the base illustrated in FIG. 5 would further comprise a retaining bar 69 that fastens between members 68. This bar would entrap the front wheel, suspending the bicycle in position.

The second primary component of the base 60 are aligning or support members 68 which are connected at point 70 and which extend out from the horizontal axis 62. They are cross-tied by brackets 72 and 74 to keep them rigid and oriented correctly. When the inventive device is used for a bicycle, the bicycle is placed between the aligning members 68 and preferably the members 68 are configured so that portions 76 and 78 correspond to the wheels of the bicycle, thus aligning the bicycle and keeping the bicycle 10 in an upright position. The members 68 also keep the bicycle orientated with the shell 20 so as to allow for ease in opening and closing the shell. Members 68, in different configurations used with other small vehicles, can also act to support or align those small vehicles.

The base 60 also contains a back support 90 which can be secured to the ground or wall at plate 96 through holes 92, by any fixing means, such as lag or expansion bolts, clamps, welding, or other types of fasteners. Alternatively, as discussed below, the units can be locked or secured together such that the units cannot be moved, disposing with the need to secure each individual unit to the wall or ground. The back support 90 also comprises flange 94 which provides a point to mount a locking mechanism so that the base 60 can be locked to the shell 20, thus securing the vehicle from theft.

Other preferred embodiments of the base structure are illustrated in FIGS. 8–13.

An alternative embodiment of the base structure is illustrated in FIGS. 8*a* and 8*b*. In this embodiment, the same leg or anchor points 64 are connected to the horizontal axis 62 as shown in FIGS. 4 and 5. This embodiment changes the aligning and supporting member 162 to a single member which rises above the floor and provides support to the body of the small vehicle. Aligning rod 160 is configured so as to allow one or more vehicles, such as bicycle wheels, to be inserted and held in place. The aligning and supporting member 162 acts to separate and support the bicycles. The end of the aligning and supporting member 162 is attached to the ground or floor surface by plate 94*a*.

Figure 9:
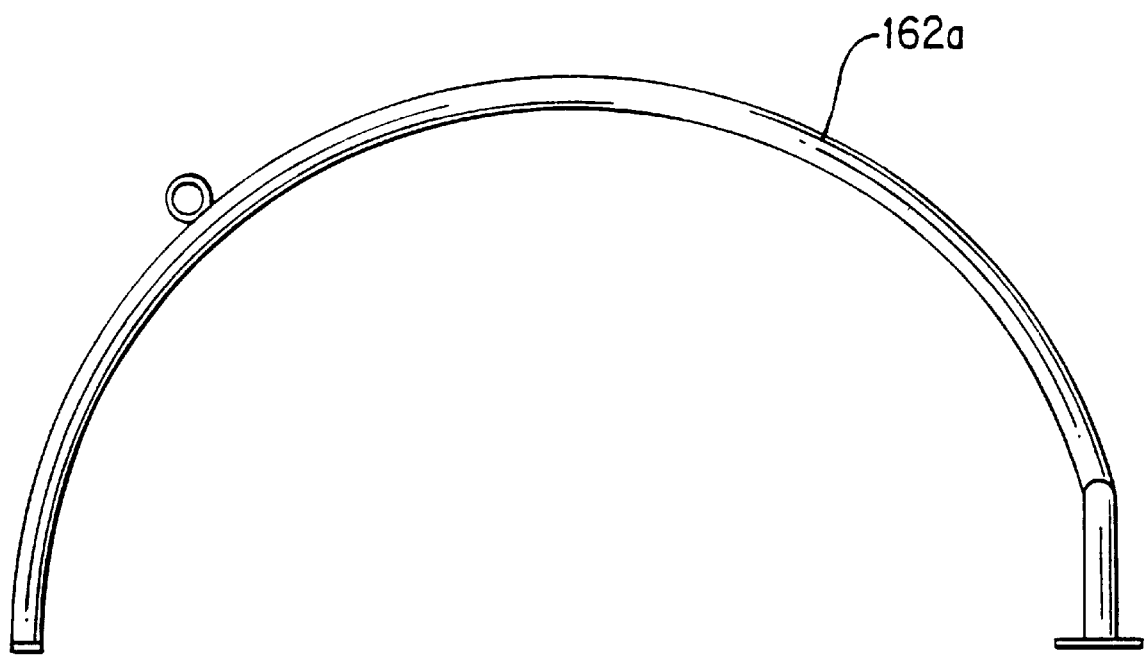
FIG. 9 is a side view of another preferred embodiment of the base structure of the inventive security devices.

FIG. 9 illustrates another embodiment of the aligning and supporting member 162*a*, used to separate and support one or more bicycles. It should also be noted that the small vehicles can also be locked to or otherwise secured to the aligning and supporting member 162.

FIGS. 10*a* and 10*b* illustrate yet another embodiment of the base structure. Aligning and supporting member 162*b* is connected to a cross axis 172, which is secured to the ground by legs 178 and support plates 174. The back end of the base is connected to the ground by plate 170. Aligning rod 160 can also be used in connection with this and any other base structure contemplated.

Figure 11:
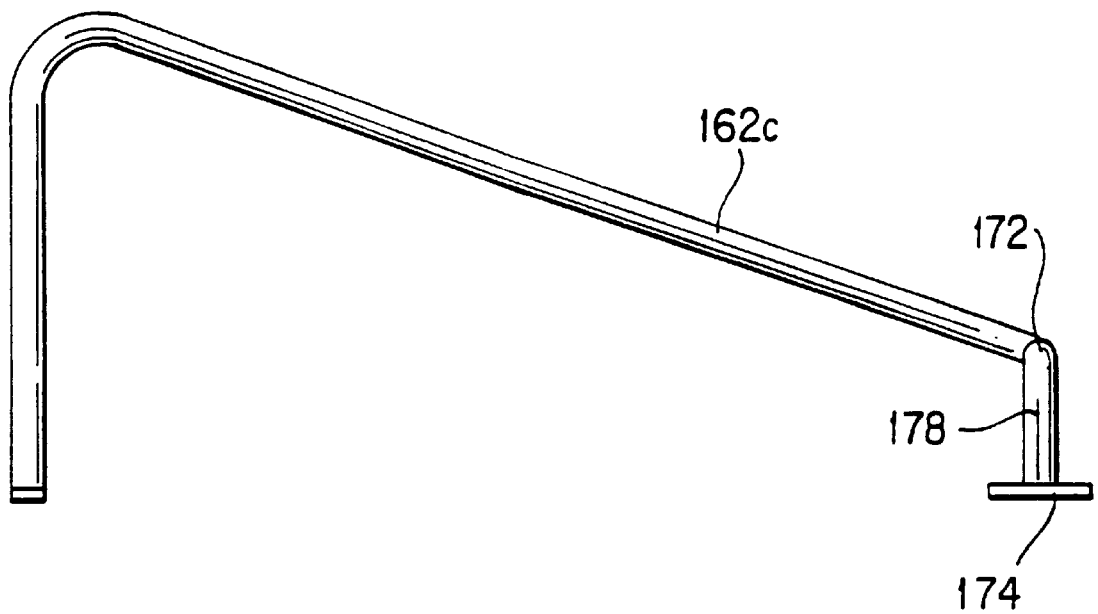
FIG. 11 is a side view of another preferred embodiment of the base structure of the inventive security device.
Figure 12A:
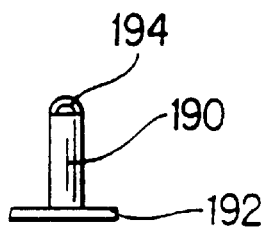
FIG. 12 is a side view of another preferred embodiment of face base structure of the inventive security device.
Figure 12B:
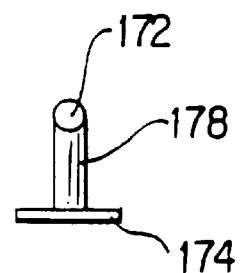

FIG. 11 illustrates another embodiment of supporting and aligning member 162*c*. FIG. 12 illustrates another embodiment which lacks the supporting and aligning member, but has a cross axis 172 about which the shell 20 can pivot, plate 174 which secures the front end of the shell and base to the ground. The embodiment of FIG. 12 also includes a back connection member 190 which allows the back end of the shell to be secured at locking point 194. Base plate 192 secures the back connection member 190 to the ground or floor.

Figure 13A:
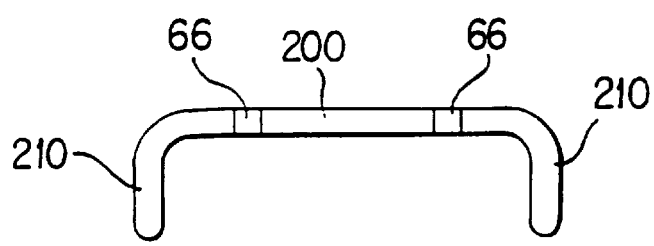
FIGS. 13a–d and e–h are front and side elevation views of various support leg structures and base plates of the base structure of the inventive security device.
Figure 13E:
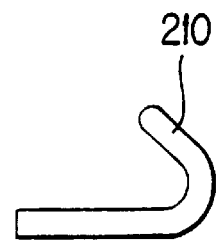
Figure 13B:
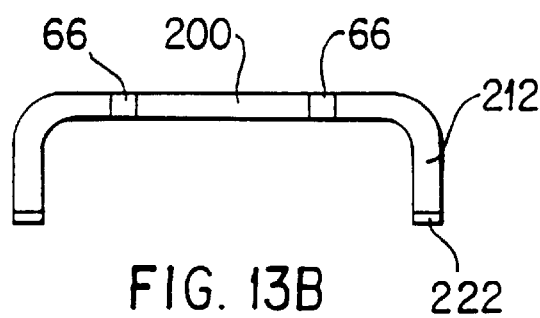
Figure 13F:
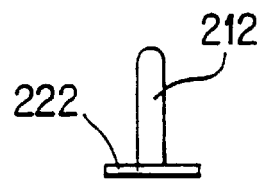
Figure 13C:
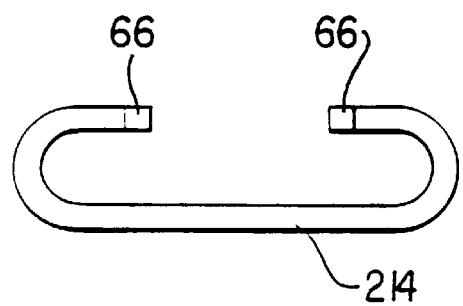
Figure 13G:
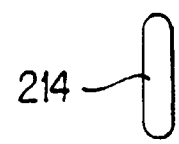
Figure 13D:
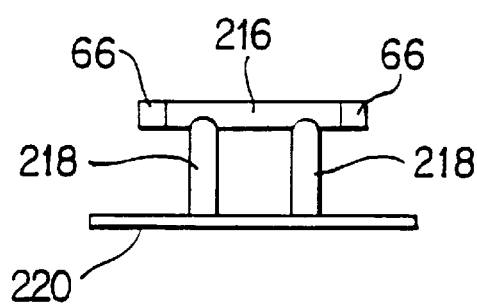
Figure 13H:
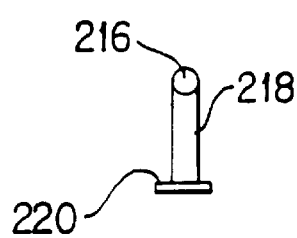

FIGS. 13*a–d* and side views *e–h* illustrate other front portions of the base structure that can be interchanged with the various supporting and aligning members illustrated above. Each of 13*a* and 13*b* show a cross axis 200 from which legs or anchor points 210 and 212 extend. In 13*b*, the bottom or the anchor points are connected to the ground by plate 222. In FIG. 13*c*, an axis 214 acts to support the base on the ground. Finally in FIG. 13*d*, the cross axis 216 is supported by legs 218 and plate 220. In all of those embodiments, tubing 66 is sleeved over the axis to allow rotation of the shell. Other embodiments are considered within the invention.

Also, as described above, the shell can be used in conjunction with many other bases, including flat sheets, other base structures used to align and support the vehicle or even the ground or a wall to which the shell can be secured and where the shell rotates about a pivot point in order to allow the insertion and removal of a small vehicle.

The preferred embodiment of the locking mechanism could be a hasp that receives a padlock or bicycle U lock. Many versions of these are well known and can be selected based upon criteria of cost, usage and personal taste. The padlock would be secured in a bell housing. Other options for the locking mechanism are coin operated timer locks (such as airport lockers), or permanent locks that are activated by key, magnetic card or code.

The preferred location for the locking mechanism that secures the hinged shell 20 to the base 60 is at the opposite end of the shell from the hinge. Other permutations are on the hinge or on both sides of the shell or a metal stanchion that comes up from the base 60 either internal or external of the shell 20. Additionally, the small vehicle may be also locked to the base itself.

One of the advantages of the of the inventive device is that it can be configured as multiple units that interlock and can be arrayed in a variety of space saving configurations. Possible arrays include (1) circular or curved banks, which has the front end or hinged end of the unit facing a common center point, so the shells open to the center, (2) parallel array, which has the units side by side facing the same direction, and, (3) opposing parallel array, with the units alternately facing one another along a common center axes. The units may also be arranged in a variety of other orientations to meet aesthetic or functional requirements.

Legs 64 of units can be ganged or coupled together. A preferred embodiment would use a section of tubing or tubings that are sleeved over legs 64 and act as a collar or coupler. The couplers may be supplied with a band depending on the configuration of the units and can be fastened in place by set screws, weld or threading. Alternatively the units can be coupled by attaching legs 64, or member 65 as the configuration requires.

In still another preferred embodiment the device can be used as trailer mounted protective covering for small vehicles, such as personal watercraft (such as Jet Skis), motorcycles and snowmobiles while in transit.

Since certain changes may be made in the above-described device without departing from the scope of the invention, it is intended that all matter contained in the above description or shown in the accompanying drawings shall be interpreted as illustrative and not in a limiting sense. The scope of the invention is defined in the claims appended hereto.

I claim:

1. An enclosure for a vehicle comprising:

a frame having a cross rod component terminating at first and second ends, and an upwardly extending rod component connected to said cross rod component, said upwardly extending rod component being shaped so as to flank a side of the vehicle for lateral support thereof; and a rigid shell pivotally mounted to the cross rod component between its first and second ends to swing between an open position for insertion and removal of the vehicle, and a closed position wherein said shell is lowered to at least substantially enclose the vehicle to resist theft of the vehicle or components thereof.

2. The enclosure of claim 1 further comprising a hinging mechanism for pivotally mounting said shell to the cross rod component.

3. The enclosure of claim 2 wherein said hinging mechanism is pneumatically or hydraulically actuated.

4. The enclosure of claim 2 wherein said hinging mechanism is spring loaded.

5. The enclosure of claim 1 wherein said rigid shell is formed with complex curves.

6. The enclosure of claim 1 wherein said rigid shell includes at least one view hole.

7. An enclosure for a vehicle comprising:

a frame having an upwardly extending rod component shaped so as to flank a side of the vehicle for lateral support thereof; and a one-piece rigid shell pivotally mounted to said frame and movable between an open position for insertion and removal of the vehicle, and a closed position to resist a theft of the vehicle or components therefrom, said one-piece shell formed with complex-curved portions.

8. The enclosure of claim 7 wherein said one-piece shell comprises at least two portions bowed inwardly toward an interior of the enclosure.

9. The enclosure of claim 7 wherein said one-piece shell comprises at least two portions bowed outwardly toward an exterior of the enclosure.

10. An enclosure for a vehicle comprising:

a frame contacting the ground in three discrete points, said frame having an upwardly extending rod component to flank a side of the vehicle and support it in an upright position; and a shell pivotally mounted to said base and movable between an open position for insertion and removal of the vehicle, and a closed position to resist theft of the vehicle or components thereof.

11. The enclosure of claim 10 wherein said shell includes a view hole.

12. The enclosure of claim 10 wherein said shell terminates at a position above the ground permitting inspection of the contents of the enclosure to deter illicit activity.

13. The enclosure of claim 10 wherein said shell is formed with complex curves.

14. An enclosure for a vehicle comprising:

a base for supporting the vehicle;

a shell pivotally mounted to said base and movable between an open position and a closed position; and a cage surrounding the vehicle beneath said shell to resist removal of the vehicle from the enclosure.

15. The enclosure of claim 14 wherein said cage supports and reinforces said shell.

* * * * *